US010826657B2

(12) United States Patent
Ma et al.

(10) Patent No.: US 10,826,657 B2
(45) Date of Patent: *Nov. 3, 2020

(54) SYSTEMS AND METHODS FOR OFDM WITH FLEXIBLE SUB-CARRIER SPACING AND SYMBOL DURATION

(71) Applicant: Huawei Technologies Co., Ltd., Shenzhen (CN)

(72) Inventors: Jianglei Ma, Ottawa (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 154 days.

This patent is subject to a terminal disclaimer.

(21) Appl. No.: 15/065,459

(22) Filed: Mar. 9, 2016

(65) Prior Publication Data

US 2016/0191216 A1 Jun. 30, 2016

Related U.S. Application Data

(63) Continuation of application No. 14/627,836, filed on Feb. 20, 2015.

(Continued)

(51) Int. Cl.
*H04L 12/24* (2006.01)
*H04L 5/00* (2006.01)
(Continued)

(52) U.S. Cl.
CPC ........... *H04L 5/001* (2013.01); *H04B 7/2615* (2013.01); *H04L 5/006* (2013.01); *H04L 5/0028* (2013.01);
(Continued)

(58) Field of Classification Search
CPC .............. H04B 7/2615; H04L 27/2602; H04L 27/2607; H04L 5/001; H04L 5/0028;
(Continued)

(56) References Cited

U.S. PATENT DOCUMENTS 9,154,353 B2 10/2015 Woodsum
9,277,426 B1 3/2016 Singh et al.
(Continued)

FOREIGN PATENT DOCUMENTS

CN 1993955 A 7/2007
CN 101299744 A 11/2008
(Continued)

OTHER PUBLICATIONS

2013 IEEE 24th International Symposium, "Sparse Code Multiple Access".*

(Continued)

*Primary Examiner* — Samina F Choudhry
(74) *Attorney, Agent, or Firm* — Slater Matsil, LLP

(57) ABSTRACT

Embodiments are provided for supporting variable sub-carrier spacing and symbol duration for transmitting OFDM or other waveform symbols and associated cyclic prefixes. The symbol duration includes the useful symbol length and its associated cyclic prefix length. The variable sub-carrier spacing and symbol duration is determined via parameters indicating the sub-carrier spacing, useful symbol length, and cyclic prefix length. An embodiment method, by a network or a network controller, includes establishing a plurality of multiple access block (MAB) types defining different combinations of sub-carrier spacing and symbol duration for waveform transmissions. The method further includes partitioning a frequency and time plane of a carrier spectrum band into a plurality of MAB regions comprising frequency-time slots for the waveform transmissions. The MAB types are then selected for the MAB regions, wherein one MAB type is assigned to one corresponding MAB region.

24 Claims, 9 Drawing Sheets

Related U.S. Application Data

(60) Provisional application No. 61/949,805, filed on Mar. 7, 2014.

(51) Int. Cl.
| | | |
|---|---|---|
| *H04W 72/02* | (2009.01) | |
| *H04B 7/26* | (2006.01) | |
| *H04L 27/26* | (2006.01) | |
| *H04W 72/04* | (2009.01) | |
| *H04W 28/06* | (2009.01) | |
| *H04W 72/00* | (2009.01) | |

(52) U.S. Cl.
CPC .......... *H04L 5/0035* (2013.01); *H04L 5/0064* (2013.01); *H04L 27/2602* (2013.01); *H04L 27/2607* (2013.01); *H04W 72/02* (2013.01); *H04W 72/042* (2013.01); *H04L 5/0023* (2013.01); *H04W 28/06* (2013.01); *H04W 72/00* (2013.01); *H04W 72/04* (2013.01)

(58) Field of Classification Search
CPC ..... H04L 5/0035; H04L 5/006; H04L 5/0064; H04L 5/0023; H04W 72/02; H04W 72/042; H04W 28/06; H04W 72/00; H04W 72/04

See application file for complete search history.

(56) References Cited

U.S. PATENT DOCUMENTS

| | | | |
|---|---|---|---|
| 2002/0105901 A1* | 8/2002 | Chini | H04L 27/2626 370/206 |
| 2005/0180313 A1* | 8/2005 | Kim | H04L 5/0042 370/208 |
| 2007/0060167 A1 | 3/2007 | Damnjanovic et al. | |
| 2007/0155387 A1* | 7/2007 | Li | H04L 27/2602 455/441 |
| 2007/0223366 A1* | 9/2007 | Yoon | H04B 1/707 370/208 |
| 2008/0095195 A1* | 4/2008 | Ahmadi | H04L 5/0007 370/478 |
| 2008/0205351 A1 | 8/2008 | Lindoff et al. | |
| 2009/0034438 A1 | 2/2009 | Soulie et al. | |
| 2009/0046569 A1* | 2/2009 | Chen | H04L 1/0029 370/203 |
| 2009/0238241 A1 | 9/2009 | Hooli et al. | |
| 2009/0304120 A1 | 12/2009 | Agrawal et al. | |
| 2010/0149961 A1 | 6/2010 | Lee et al. | |
| 2011/0032850 A1 | 2/2011 | Cai | |
| 2011/0051711 A1 | 3/2011 | Kishiyama et al. | |
| 2011/0142151 A1 | 6/2011 | Zhang et al. | |
| 2011/0176622 A1* | 7/2011 | Higashinaka | H04J 11/0033 375/259 |
| 2011/0188481 A1 | 8/2011 | Damnjanovic et al. | |
| 2012/0002582 A1 | 1/2012 | Kim et al. | |
| 2012/0046047 A1 | 2/2012 | Popovic et al. | |
| 2012/0087323 A1 | 4/2012 | Feng et al. | |
| 2012/0315939 A1 | 12/2012 | Berberana | |
| 2013/0051485 A1 | 2/2013 | Taori et al. | |
| 2013/0083755 A1 | 4/2013 | Berberana Fernandez-Murias et al. | |
| 2013/0084879 A1 | 4/2013 | Abe et al. | |
| 2013/0114525 A1* | 5/2013 | Ahmadi | H04L 5/0094 370/329 |
| 2013/0329667 A1 | 12/2013 | Wengerter et al. | |
| 2014/0192925 A1 | 7/2014 | Li | |
| 2014/0233437 A1 | 8/2014 | Abdoli et al. | |
| 2014/0233664 A1 | 8/2014 | Abdoli et al. | |
| 2014/0243005 A1* | 8/2014 | Yanover | H04L 5/0053 455/452.1 |
| 2014/0341179 A1 | 11/2014 | Yokomakura et al. | |
| 2015/0049844 A1* | 2/2015 | Stott | H03M 13/2732 375/298 |
| 2015/0124579 A1 | 5/2015 | Sartori et al. | |
| 2015/0180622 A1* | 6/2015 | Yoo | H04L 1/1854 370/330 |
| 2015/0282178 A1* | 10/2015 | Kim | H04B 7/2656 370/329 |
| 2016/0036569 A1 | 2/2016 | Kim et al. | |
| 2016/0143011 A1* | 5/2016 | Xia | H04L 1/0031 370/330 |
| 2016/0219535 A1 | 7/2016 | Zhang et al. | |
| 2016/0337097 A1* | 11/2016 | Martin | H04W 76/14 |
| 2017/0295110 A1 | 10/2017 | Kato et al. | |
| 2019/0013982 A1 | 1/2019 | Sun et al. | |

FOREIGN PATENT DOCUMENTS

| | | | | |
|---|---|---|---|---|
| CN | 101449535 | A | 6/2009 | |
| CN | 101904125 | A | 12/2010 | |
| CN | 101904208 | A | 12/2010 | |
| CN | 101940024 | A | 1/2011 | |
| CN | 102739594 | A | 10/2012 | |
| CN | 102884856 | A | 1/2013 | |
| EP | 0869647 | A2 | 3/1998 | |
| EP | 1538802 | A2 | 6/2005 | |
| JP | 2006352786 | A | 12/2006 | |
| JP | 2013521701 | A | 6/2013 | |
| RU | 2472296 | C2 | 12/2010 | |
| RU | 2437222 | C2 | 12/2011 | |
| RU | 2460226 | C2 | 8/2012 | |
| RU | 2485708 | C2 | 3/2013 | |
| RU | 2496245 | C2 | 10/2013 | |
| WO | 2011120594 | A1 | 10/2011 | |
| WO | 2013017930 | A2 | 2/2013 | |
| WO | WO2013173992 | A1 * | 11/2013 | ............... H04J 3/00 |

OTHER PUBLICATIONS

International Search Report and Written Opinion Received in International Application No. PCT/CN2015/073646 dated Jun. 15, 2015, 11 pages.

Li, et al., "A Resource Block Based Filtered OFDM Scheme and Performance Comparison," May 6, 2013, XP32777892, 5 pages.

"Impact of UMTS Low Pass Filter Receiver on the OFDM Signal," Wavecom, 3GPP TSG-RAN-1, Meeting #35, R1-031192, Nov. 2003, 6 pages, Lisbon, Portugal.

\* cited by examiner

SYSTEMS AND METHODS FOR OFDM WITH FLEXIBLE SUB-CARRIER SPACING AND SYMBOL DURATION

This application is a continuation of U.S. patent application Ser. No. 14/627,836, filed on Feb. 20, 2015 by Jianglei Ma et al. and entitled "Systems and Methods for OFDM with Flexible Sub-Carrier Spacing and Symbol Duration," which claims the benefit of U.S. Provisional Application No. 61/949,805 filed on Mar. 7, 2014 by Jianglei Ma et al. and entitled "OFDM System with Flexible Frequency-Time Lattice," all of which applications are hereby incorporated herein by reference as if reproduced in their entireties.

TECHNICAL FIELD

The present invention relates to wireless communications, and, in particular embodiments, to systems and methods for transmitting different waveforms using flexible sub-carrier spacing and symbol duration. In some particular embodiments, the waveforms are orthogonal frequency division multiplexed (OFDM) waveforms having different parameters.

BACKGROUND

In existing wireless standards, including those for fourth generation (4G) and earlier wireless networks, a standardized waveform has been selected based on its suitability for general use. There are a variety of situations in which a different waveform may provide better performance, but to address overall performance and implementation limitations, only the standardized waveform is available. By using a single waveform, both transmitter and receiver designs can be simplified and added computations complexity can be avoided. However, to provide improved performance in an ever increasing number of deployment scenarios, the use of a single waveform is an obstacle that can impede performance. 4G networks make use of an orthogonal frequency division multiplexed (OFDM) waveform due to a number of characteristics. In many scenarios, it may be beneficial to allow for different OFDM waveform configurations for different channel conditions and/or different deployment/application scenarios. Consequently, next generation wireless communication protocols will likely include air interfaces that support waveform adaptation to allow the most suitable waveform to be dynamically selected based on various criteria, such as channel conditions, traffic types, transmission mode, user equipment (UE) capabilities, or other factors. As such, techniques and/or mechanisms for providing flexible air interfaces that are capable of being seamlessly adapted for diverse waveforms are desired, e.g., to offer resilient radio performance efficiently under various channel conditions.

SUMMARY OF THE INVENTION

In accordance with an embodiment, a method by a network controller supporting wireless communications includes establishing a plurality of multiple access block (MAB) types defining different combinations of sub-carrier spacing and symbol duration for waveform transmissions. The method further includes partitioning a frequency and time plane of a carrier spectrum band into a plurality of MAB regions comprising frequency-time slots for the waveform transmissions. At least two different MAB types from the established plurality of MAB types are then selected for the MAB regions.

In accordance with another embodiment, a method by a network component supporting wireless communications includes selecting a MAB region of a plurality of predetermined MAB regions partitioning a frequency and time plane of a carrier spectrum band, and transmitting a signal on frequency-time slots in the MAB region in accordance with a MAB type selected for the MAB region. The MAB type is from a plurality of predetermined MAB types. The method further includes reducing a bandwidth of the transmitted signal using a spectrum filter in accordance with a bandwidth of the MAB type.

In accordance with another embodiment, a method by a network device supporting wireless communications includes receiving a signal on frequency-time slots in a MAB region of a plurality of MAB regions partitioning a frequency and time plane of a carrier spectrum band, and identifying a MAB type selected for the MAB region and defining a sub-carrier spacing and a symbol duration for the frequency-time slots of the MAB region. The method further includes establishing a spectrum filter with bandwidth in accordance with the MAB type, and detecting the signal using the spectrum filter.

In accordance with another embodiment, a network controller supporting wireless communications comprises at least one processor and a non-transitory computer readable storage medium storing programming for execution by the at least one processor. The programming includes instructions to establish a plurality of MAB types defining different combinations of sub-carrier spacing and symbol duration for waveform transmissions, and partition a frequency and time plane of a carrier spectrum band into a plurality of MAB regions comprising frequency-time slots for the waveform transmissions. The network controller also selects, for the MAB regions, at least two different MAB types form the established MAB types.

In accordance with another embodiment, a network component supporting wireless communications comprises at least one processor and a non-transitory computer readable storage medium storing programming for execution by the at least one processor. The programming includes instructions to select a MAB region of a plurality of predetermined MAB regions partitioning a frequency and time plane of a carrier spectrum band, and transmit a signal on frequency-time slots in the MAB region in accordance with a MAB type selected for the MAB region. The MAB type is from a plurality of predetermined MAB types. The network component is further configured to reduce a bandwidth of the transmitted signal using a spectrum filter in accordance with a bandwidth of the MAB type.

In accordance with yet another embodiment, a network device supporting wireless communications comprises at least one processor and a non-transitory computer readable storage medium storing programming for execution by the at least one processor. The programming includes instructions to obtain a signal on frequency-time slots in a MAB region of a plurality of MAB regions partitioning a frequency and time plane of a carrier spectrum band, and identify a MAB type selected for the MAB region and defining a sub-carrier spacing and a symbol duration for the frequency-time slots of the MAB region. The network device is further configured to establish a spectrum filter with a bandwidth in accordance with the MAB type, and detect the signal using the spectrum filter.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
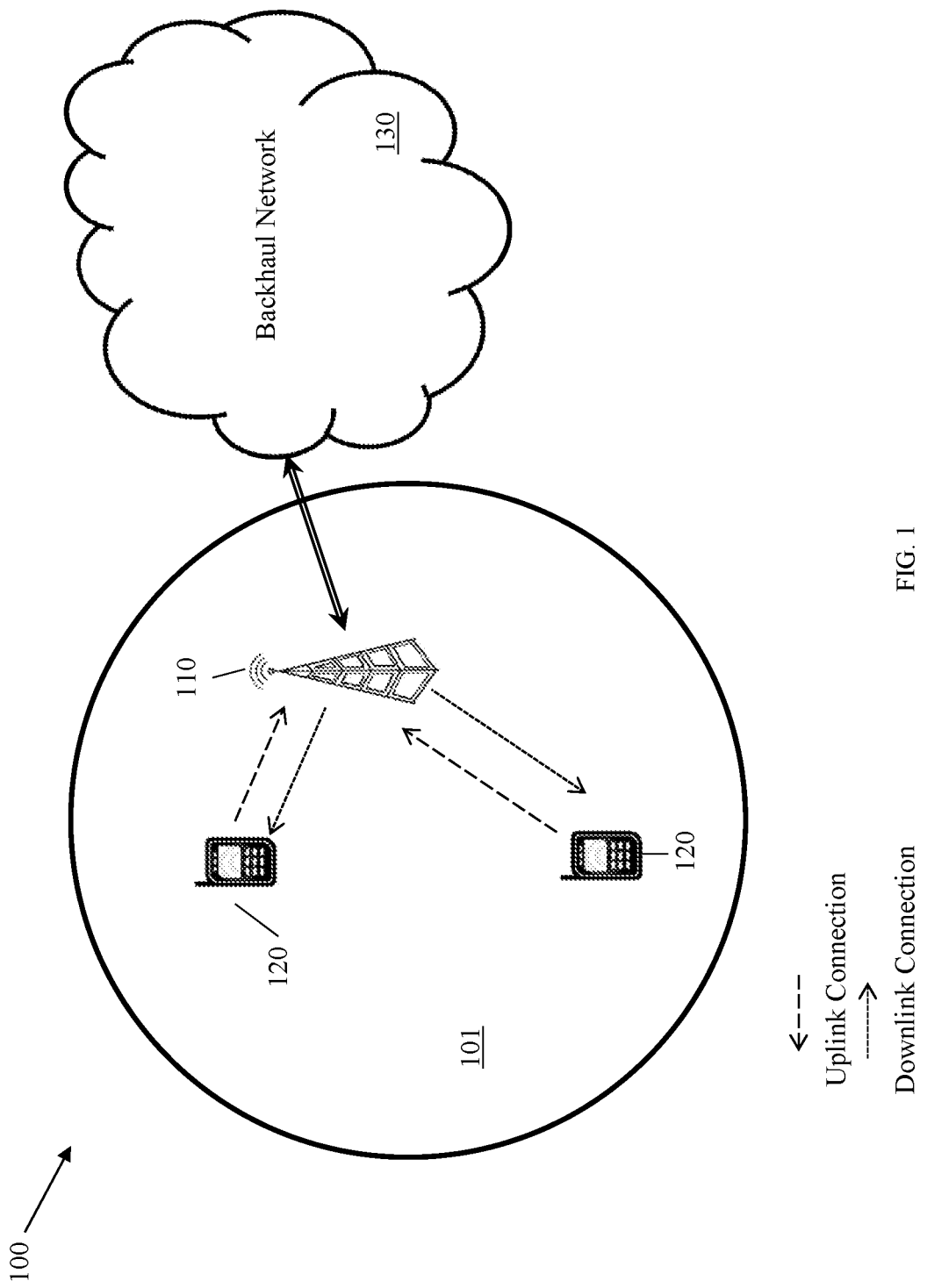
FIG. 1 illustrates a diagram of an embodiment wireless communications network.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Conventional OFDM systems use a fixed frequency (sub-carrier) spacing and symbol duration for transmitting each OFDM symbol and associated cyclic prefix. The sub-carrier spacing is fixed for the entire spectrum of a component carrier or a number of component carriers, e.g., based on the highest degree of user equipment (UE) mobility to be supported. A sub-carrier spacing represents a spacing for each sub-carrier which is an individual detectable frequency band within a carrier (a frequency band for transmission). Each sub-carrier can be assigned to one or more clients for communications. Further, an OFDM symbol length is an individual detectable time duration for transporting information or data. The symbol length is the time it takes to transmit a symbol and its associated CP. The portion of the symbol length used for transmitting the symbol, and excluding the CP length, is referred to herein as the useful symbol length. The fixed sub-carrier spacing and fixed symbol duration in conventional OFDM schemes also serve to limit cyclic prefix options. A cyclic prefix is added to transmitted symbol (e.g., bits of information) and serves as a guard interval to eliminate the inter-symbol interference. The length of the cyclic prefix is usually determined by the channel delay spread. Due to the fixed sub-carrier spacing and fixed OFDM symbol duration, conventional OFDM schemes may be unable to satisfy the spectrum efficiency and Quality of Service (QoS) requirements of next-generation networks, which will likely need to support much higher mobility, lower latency and overhead, more channel types, more deployment environments, and more transmission schemes. Thus, new OFDM schemes capable of supporting more flexible air interfaces are desired.

Embodiments of this disclosure provide methods for supporting variable sub-carrier spacing and symbol duration for transmitting OFDM symbols and associated cyclic prefixes. The symbol duration includes the useful OFDM symbol length and its associated cyclic prefix length. The variable sub-carrier spacing and symbol duration is determined via parameters indicating the sub-carrier spacing, useful symbol length, and cyclic prefix length. The parameters are referred to herein as frequency-time primitives. The embodiments also allow variable sub-carrier spacing and symbol duration granularities within the spectrum band of the same carrier. A carrier is a spectrum allocation available for communications in a system and includes a plurality of sub-carriers (which are typically frequency sub-bands) separated by defined spacing. In long term evolution (LTE) for example, a carrier corresponds to a spectrum of certain bandwidth, such as 5, 10 and 20 Gigahertz. In an embodiment of the disclosure, a basic multiple access block (MAB) is defined as a transport unit that occupies a specified bandwidth and lasts for specified duration, for the carrier of the system. The variable sub-carrier spacing and symbol duration allocation can include MAB regions with different sub-carrier spacing and/or symbol time duration, as described below. The variable frequency-time primitives can correspond to various MAB regions based on Filtered OFDM (F-OFDM) transmissions. As used herein, the term basic MAB, or MAB for short, represents the minimal sub-carrier spacing and symbol duration for resource allocation. Each MAB region comprises of a number of basic MABs, and different sub-carrier spacing and symbol duration (useful symbol length and cyclic length) can be supported in different MAB regions. Aspects provided herein include variable OFDM frequency-time primitives that are dynamically selected to meet performance and efficiency demands.

FIG. 1 illustrates a network 100 for communicating data. The network 100 comprises a base station or an access point (AP) 110 having a coverage area 101, a plurality of client mobile devices 120, and a backhaul network 130. The AP 110 may comprise any component capable of providing wireless access by establishing uplink (dashed line) and/or downlink (dotted line) connections with the mobile devices 120. Examples of the AP 110 include a base station, a NodeB, an enhanced NodeB (eNB), a picocell, a femtocell, a WiFi access point and other wirelessly enabled devices. The mobile devices 120 may comprise any component capable of establishing a wireless connection with the AP 110, such as a user equipment (UE) or other wirelessly enabled devices. The backhaul network 130 may be any component or collection of components that allow data to be exchanged between the AP 110 and a remote end (not shown). In embodiments, the network 100 may comprise various other wireless devices, such as relays, low power nodes, and other user or client devices with wireless communications capability.

Figure 2:
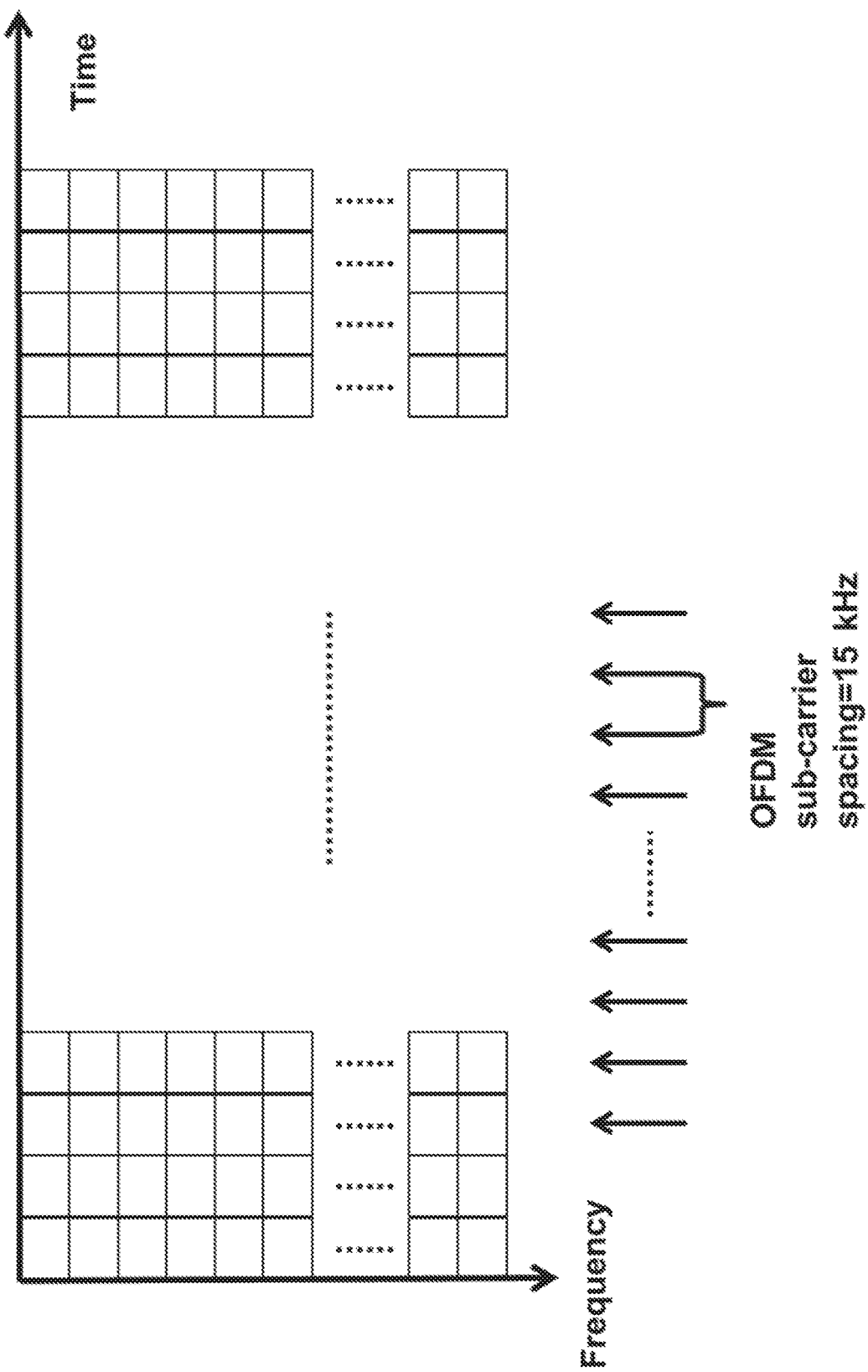
FIG. 2 illustrates a diagram of a conventional OFDM waveform having a fixed sub-carrier spacing.

FIG. 2 illustrates a diagram of a conventional OFDM waveform having a fixed sub-carrier spacing, as may be common in conventional LTE and LTE advanced (LTE-A) networks. As shown, the orthogonality in the frequency domain is maintained by using a uniform sub-carrier spacing of 15 kilohertz (KHz) over all the frequency-time plane of the spectrum band of the carrier.

Figure 3:
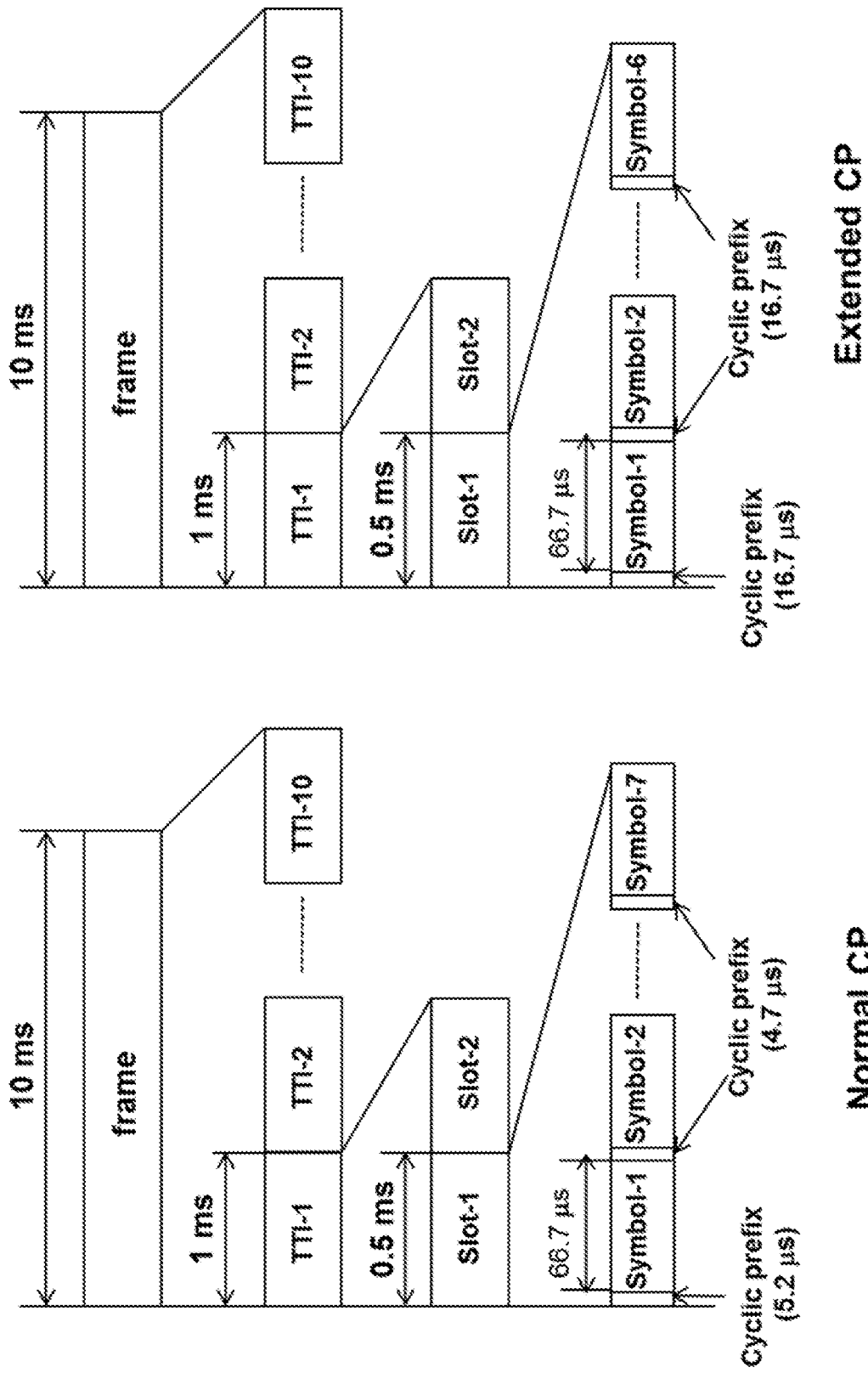
FIG. 3 illustrates a diagram of an OFDM waveform having a fixed symbol duration.

FIG. 3 is a diagram illustrating a conventional OFDM waveform having a fixed symbol duration (a sum of useful symbol length and cyclic prefix length), as may be common in conventional LTE and LTE-A networks. As shown, the length of useful OFDM symbols is fixed based on the common sampling frequency and sub-carrier spacing. Thus, only a limited number of cyclic prefix configurations are supported. In one configuration, a normal cyclic prefix length is supported for a frame of 10 millisecond (ms) duration. The frame is divided into 10 transmission time intervals (TTIs), each having a 1 ms duration. The TTI is further divided into two slots, each of 0.5 ms. Each slot is divided into 7 OFDM symbols, which is the minimum non-divisible transmission unit. Each symbol has a length of 66.7 microsecond (μs) and is preceded by a normal cyclic prefix length of 5.2 or 4.7 μs. In another configuration, an extended cyclic prefix length is supported for the frame. In this configuration, the cyclic prefix length is 16.7 μs.

The embodiment methods below support variable sub-carrier spacing and symbol duration granularities in the same carrier spectrum band. This may aid in mitigating problems associated with fixed sub-carrier spacing and fixed symbol duration. In one embodiment, a basic multiple access block (MAB) is defined as a transport unit that occupies a specified bandwidth and lasts for specified time duration. Different MAB sizes can be defined. For example, a smaller MAB can be used for common channels (e.g., synchronization channel, common broadcast channel), while larger MAB can be used by individual channels (e.g., UE specific data channels). A number of MAB types can be defined. For instance, waveforms associated with different MAB types may have different sub-carrier spacing, different useful OFDM symbol length, and/or different cyclic prefix length. Examples of MAB types are described further below. In embodiments, the time and frequency plane of spectrum resources may be partitioned into different MAB regions, with each MAB region consisting of basic frequency-time slots having predefined sub-carrier spacing and symbol duration, also referred to herein as basic multiple access blocks, of same MAB type.

In further embodiments, filtered OFDM waveforms can be used to control interference between adjacent multiple access blocks (frequency-time slots with different sub-carrier spacing and symbol duration). Due to having different sub-carrier spacing and symbol duration, orthogonality may no longer be maintained in the frequency-time plane. In this case, a suitable digital filter is applied to frequency bands occupied by a MAB region to control the out-of-band emission so that the interference between different MABs does not cause performance loss. Additionally, guard tones may be used (between the sub-carriers) to roll off the digital filter edges. In the same or other embodiments, filter bank multi-carrier (FBMC) waveforms may be used to maintain orthogonality between different multiple access blocks. FBMC waveforms are described in U.S. Non-Provisional patent application Ser. No. 14/035,161, filed on Sep. 9, 2013 and entitled "System and Method for Weighted Circularly Convolved Filtering in OFDM-OQAM," and U.S. Non-Provisional patent application Ser. No. 14/184,078, filed on Feb. 19, 2014 and entitled "Frame Structure for Filter Bank Multi-Carrier (FBMC) Waveforms," both of which are incorporated by reference herein as if reproduced in their entireties.

In an embodiment OFDM waveform configuration, four MAB types are defined, including a special MAB type, a MAB type-1, a MAB type-2, and a MAB type-3. As used herein, the term special MAB type refers to a MAB type that has, among the defined MAB types, a predetermined sub-carrier spacing and cyclic prefix applied to regional common transmission channels, such as synchronization channel and broadcast channel, which require larger sub-carrier spacing and cyclic prefix. For instance, the special MAB type can have the largest sub-carrier spacing and longest cyclic prefix among the defined MAB types. In one embodiment, the special MAB type is broadcast by multiple transmitters in a certain region, for example in a region configured for radio access virtualization. The special MAB type has relatively high tolerance for synchronization error, and thus is suitable to support high mobility and low complexity devices, e.g., devices incapable of achieving high degrees of synchronization accuracy. The special MAB type may also be applied to control and data transmission of ultra-high mobility devices and devices receiving and/or sending coordinated multipoint (CoMP) transmissions. The MAB type-1 has the smallest sub-carrier spacing and longest symbol duration (e.g., longest cyclic prefix length), and is suitable for low-mobility devices and for supporting large scale CoMP transmissions or broadcast service. The MAB type-2 has a medium sub-carrier spacing and medium cyclic prefix length, and is suitable for medium-mobility devices and for supporting small scale CoMP transmissions or non-CoMP transmission. The MAB type-3 has the largest sub-carrier spacing and shortest cyclic prefix length, and is suitable for the highest mobility devices, for non-CoMP transmission, and for communications requiring very low latency. In other embodiment, more or fewer MAB types can be defined and used. The MAB types may have varying sizes of sub-carrier spacing, useful symbol length, cyclic prefix length, or combinations thereof. For example, two different MAB types may have same sub-carrier spacing but different useful symbol length or cyclic prefix length or may have same symbol or cyclic prefix length but different sub-carrier spacing. The sizes of sub-carrier spacing, symbol or cyclic prefix length are defined for each MAB type to meet desired system criteria, conditions, or requirements (e.g., QoS).

The flexible sub-carrier spacing and symbol duration allocation (e.g., corresponding to various MAB types) may be defined by various OFDM parameters (or frequency-time primitives), such as sub-carrier spacing, useful symbol length, cyclic prefix length, or combinations thereof. In one embodiment, a plurality of available sub-carrier spacing parameters (e.g., $\Delta f$, $2\Delta f$, and $4\Delta f$), a plurality of useful symbol length parameters (e.g., T, T/2, and T/4), and a plurality of cyclic prefix length parameters (e.g., CP, CP/2, CP/4, CP/2+T/4). In this case, it is sufficient to define 3 basic parameter values ($\Delta f$, T, and CP) to establish all the parameters. Other configurations may also be used in other embodiments.

Figure 4:
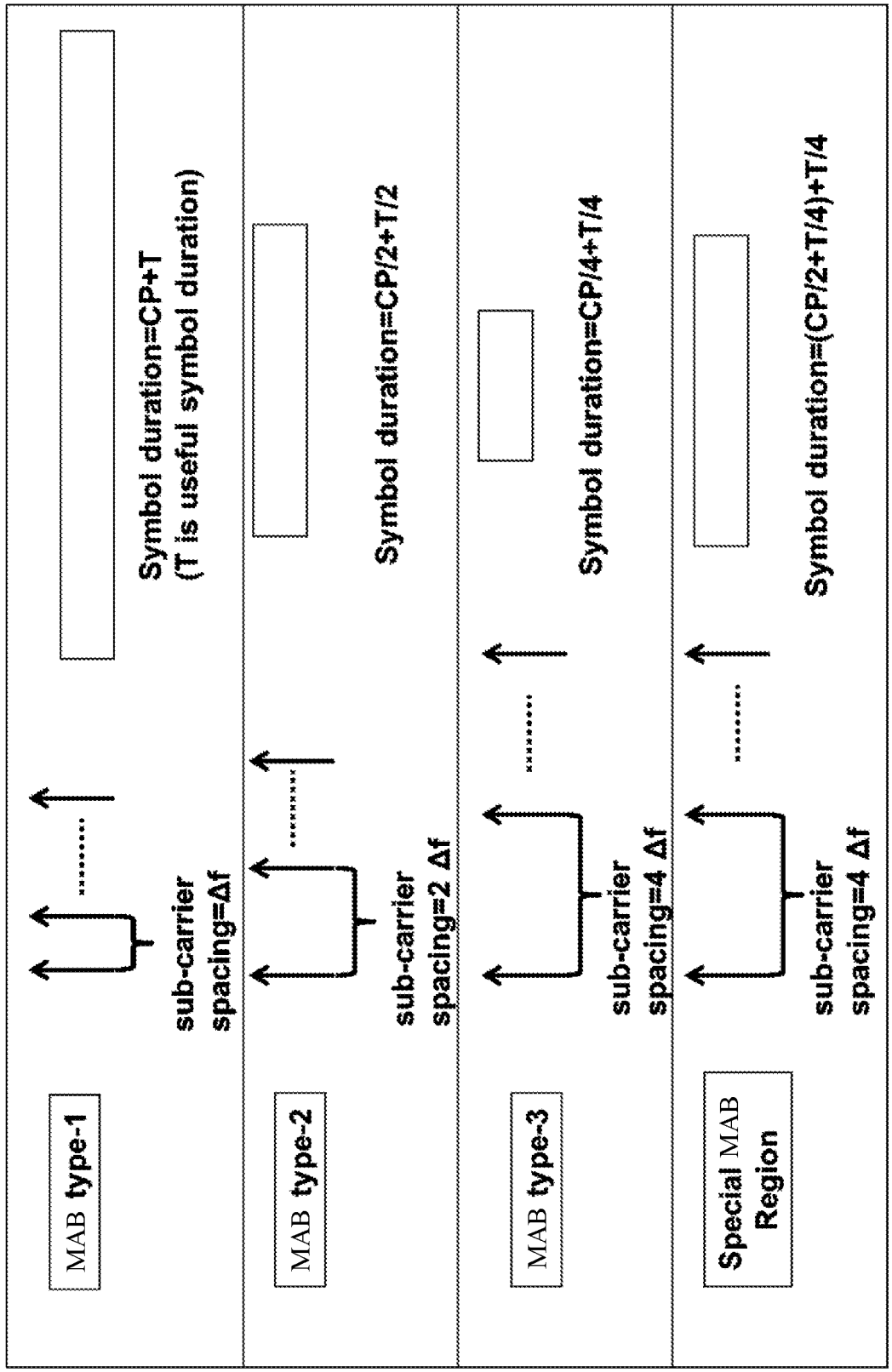
FIG. 4 illustrates diagrams of embodiment multiple access block (MAB) types.

FIG. 4 illustrates embodiment MAB types that may be used in OFDM communications, as described above. The MAB types includes the MAB type-1 with sub-carrier spacing Δf and a symbol duration CP+T. For example, Δf can be defined as 15 KHz, CP can be defined as 4.7, 5.2, or 16.7 μs, and T can be defined as 66.7 μs. Alternatively, other suitable values for Δf, CP, and T can be defined. The MAB types also include the MAB type-2 with sub-carrier spacing 2Δf and symbol duration CP/2+T/2, the MAB type-3 with sub-carrier spacing 4Δf and symbol duration CP/4+T/4, and the special MAB type or region with sub-carrier spacing 4Δf and symbol duration (CP/2+T/4)+T/4.

Figure 5:
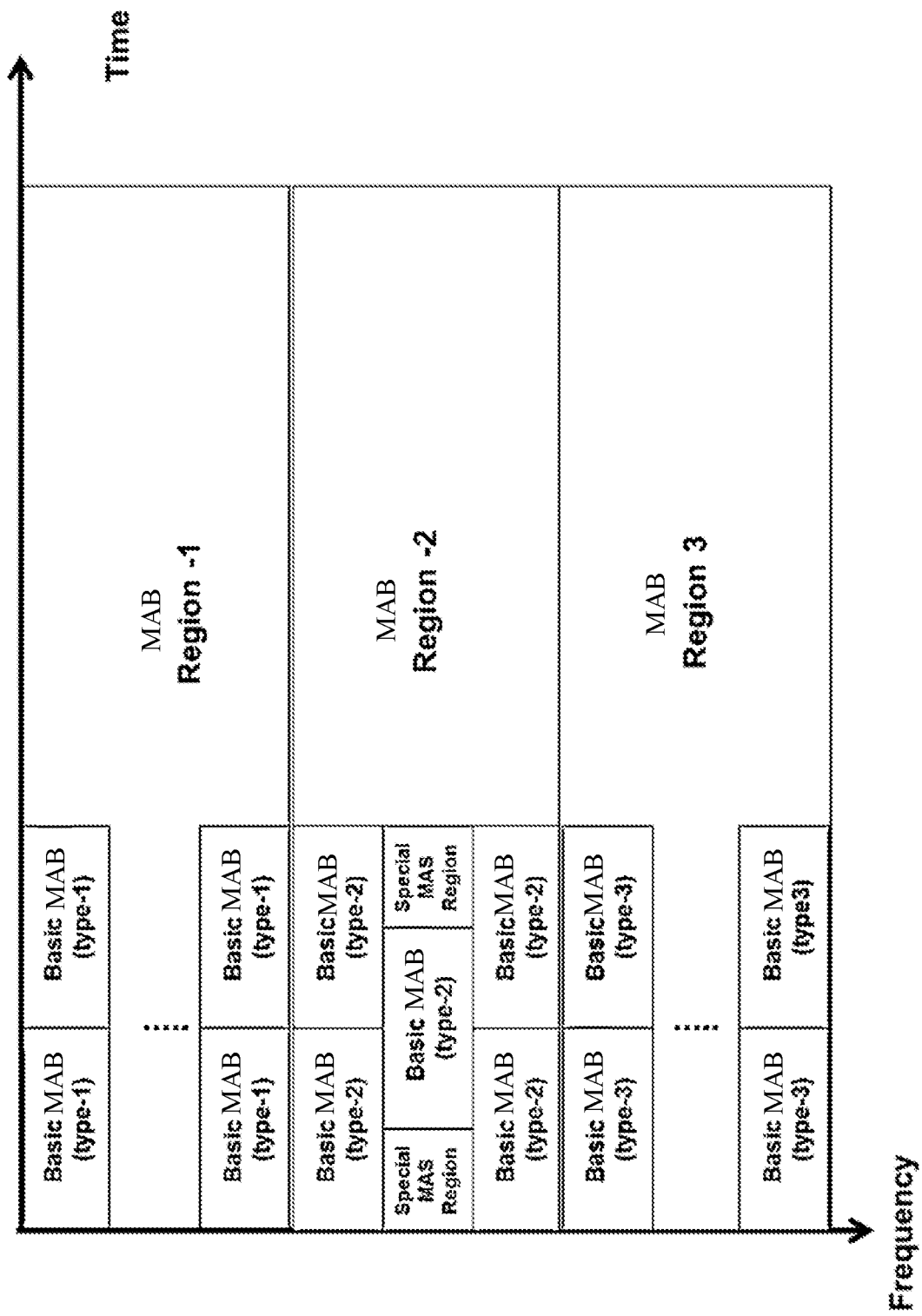
FIG. 5 illustrates a diagram of an embodiment of flexible sub-carrier spacing and symbol duration allocation.

FIG. 5 illustrates an embodiment of flexible sub-carrier spacing and symbol duration allocation that may be used in OFDM schemes provided herein. The flexible sub-carrier spacing and symbol duration allocation is established by defining MAB regions, where basic multiple access blocks are defined in each region according to a MAB type. The MAB types are predefined, as described above, with corresponding sub-carrier spacing and symbol duration. In this embodiment, a first MAB region comprises basic multiple access blocks according to the MAB type-1 (basic MAB). A second MAB region comprises basic multiple access blocks according to the MAB type-2 and further basic multiple access blocks according to the special MAB type. A third MAB region comprises basic multiple access blocks according to the MAB type-3. The sizes of the blocks within each region can be defined such as the regions are divisible to the basic slots without waste of time/frequency resources. The clients receive the corresponding MABs in the corresponding regions using F-OFDM, which allows the detection of sub-carriers with variable spacing for different MAB types.

Figure 6:
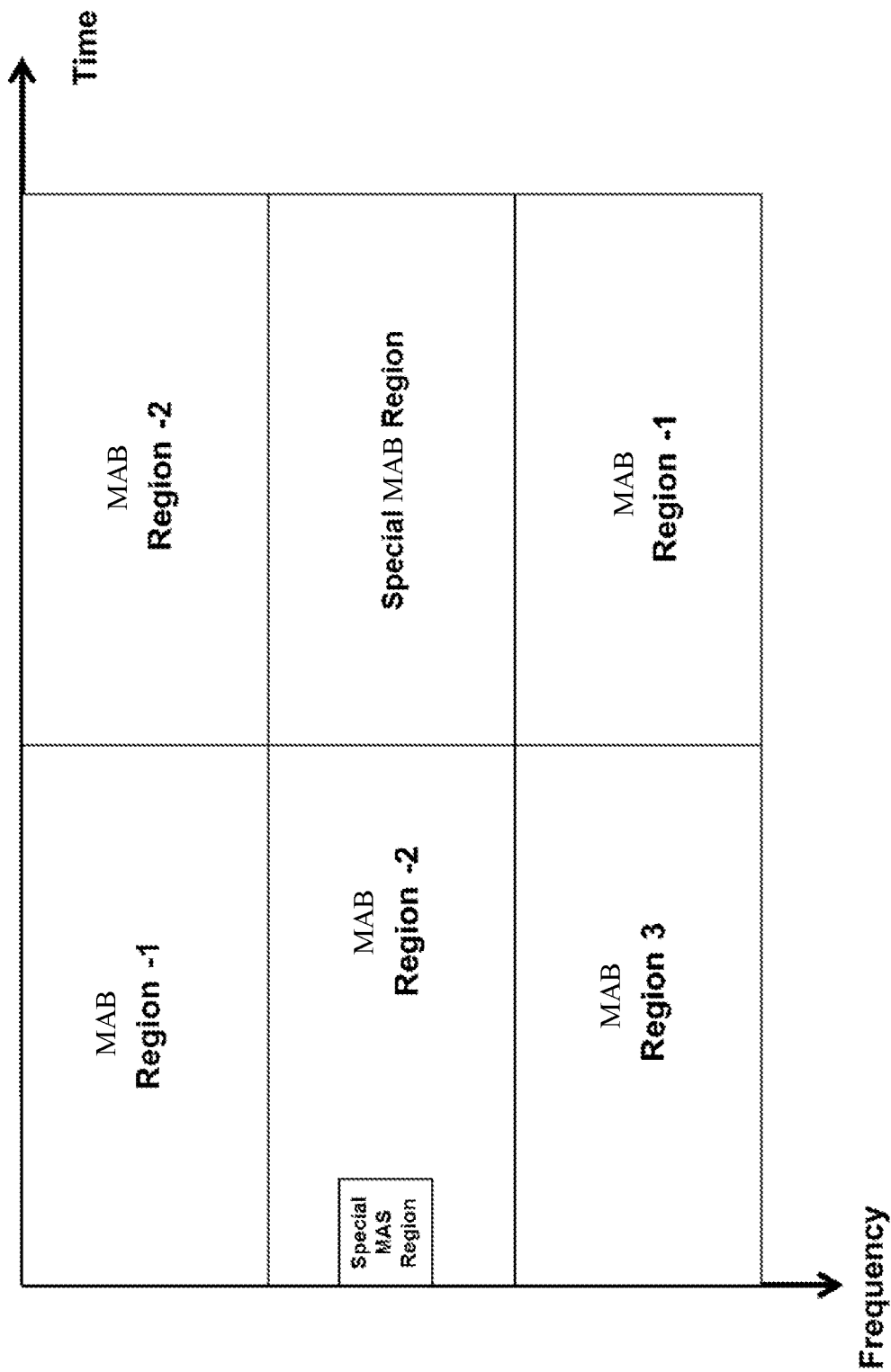
FIG. 6 illustrates a diagram of an embodiment of flexible sub-carrier spacing and symbol duration allocation.

FIG. 6 illustrates another embodiment of flexible sub-carrier spacing and symbol duration allocation that may be used in OFDM schemes provided herein. In this embodiment, the frequency-time plane associated with the spectrum band of a carrier is divided into MAB regions with replication of at least one of the regions in different areas of the plane. For instance, a first MAB region (e.g., of MAB type-1) is defined in two areas of the plane, at the top-left corner and the bottom-right corner of the frequency-time plane. A second MAB region (e.g., of MAB type-2) is further defined in two other areas of the plane, as shown. The plane also comprises a MAB type-3 region and a special MAB region. The clients can access the corresponding regions and blocks using F-OFDM. The flexible sub-carrier spacing and symbol duration allocation embodiments above are merely examples, and other configurations of MAB types, regions, and/or flexible sub-carrier spacing and symbol duration allocation configurations are possible using the embodiment schemes herein.

In an embodiment, a signaling mechanism is used for supporting the flexible sub-carrier spacing and symbol duration formats described above. The signaling mechanism allows UEs to access the network through a special MAB, e.g., as described above, with the locations of synchronization channel and broadcast channels being fixed and predefined. Network broadcasts may carry a MAB region configuration using the special MAB. MAB region assignments may be semi-statically configured via signaling and carried by the special MAB. Alternatively, MAB region assignments may be dynamically configured with signaling carried in a pre-defined MAB type, e.g., the MAB type-2 above. In embodiments, a mapping between one or more types of traffic/transmissions and one or more corresponding MAB regions is pre-defined. For example, certain applications (e.g., machine-to-machine (M2M)) may be mapped to one MAB type (e.g., MAB type-1), while certain access configurations (e.g., contention based or grant-free access) can be mapped to another MAB type (e.g., MAB type-2). Certain types of devices and/or network configurations can also be served by certain MAB types. For example, a high speed train may be served by a special MAB type.

The schemes above provide flexible sub-carrier spacing and symbol duration allocation and MAB region based transmissions. Variable waveform parameters for configuring the multiple access blocks and the MAB regions can also be dynamically selected to meet performance and efficiency demands. The regions can be partitioned to adapt to network characteristics, e.g., traffic load, traffic type, or others. The schemes provide efficient multiple access schemes to meet variable QoS requirements, support different transmission schemes, and support UEs with different levels of mobility and complexities. The schemes also provide higher spectral efficiency, greater flexibility, and shorter latencies than is otherwise provided by static sub-carrier spacing and symbol duration allocation of conventional OFDM schemes.

Figure 7:
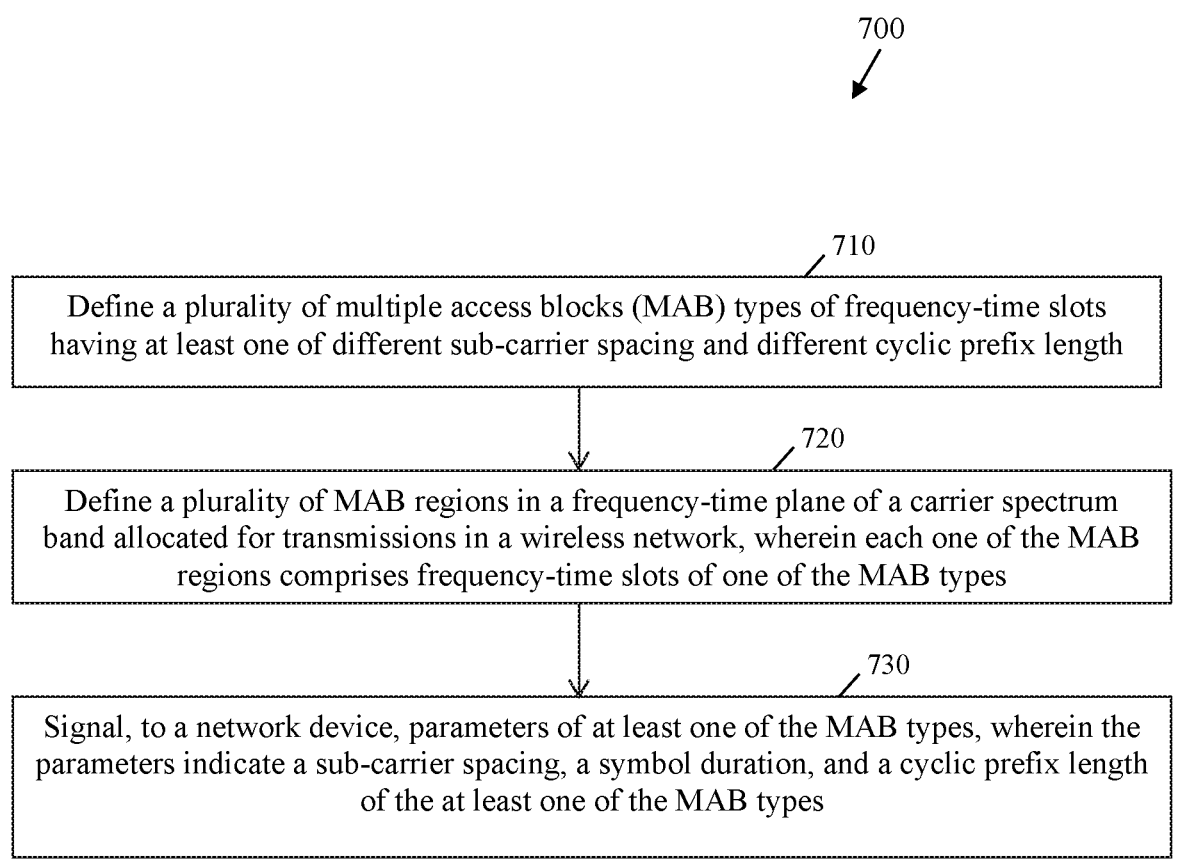
FIG. 7 illustrates a flow diagram of an embodiment method for providing flexible sub-carrier spacing and symbol duration according to different MAB types.

FIG. 7 illustrates an embodiment method 700 for providing flexible sub-carrier spacing and symbol duration allocation according to different MAB types. The method can be implemented by a network component, such as a base station. At step 710, a plurality of MAB types are defined having frequency-time slots with at least one of the MAB types having at least one of a different sub-carrier spacing, a different useful symbol length and a different cyclic prefix length. For example, the MAB types include the special MAB type and at least one of MAB type-1, MAB type-2, and MAB type 3 described above. At step 720, a plurality of MAB regions are defined in a frequency-time plane of the spectrum band of the carrier allocated for transmissions in a wireless network, wherein each one of the MAB regions comprises frequency-time slots or blocks of at least one of the MAB types. Examples of the MAB regions are shown in FIG. 5 and FIG. 6, as described above. At step 730, parameters of at least one of the MAB types are signaled to a network device (e.g., UE). The parameters indicate a sub-carrier spacing, a useful symbol length, and a cyclic prefix length of the at least one of the MAB types. The parameters include the sub-carrier spacing, the useful symbol length, and/or the cyclic prefix length of the one or more MAB types.

Figure 8:
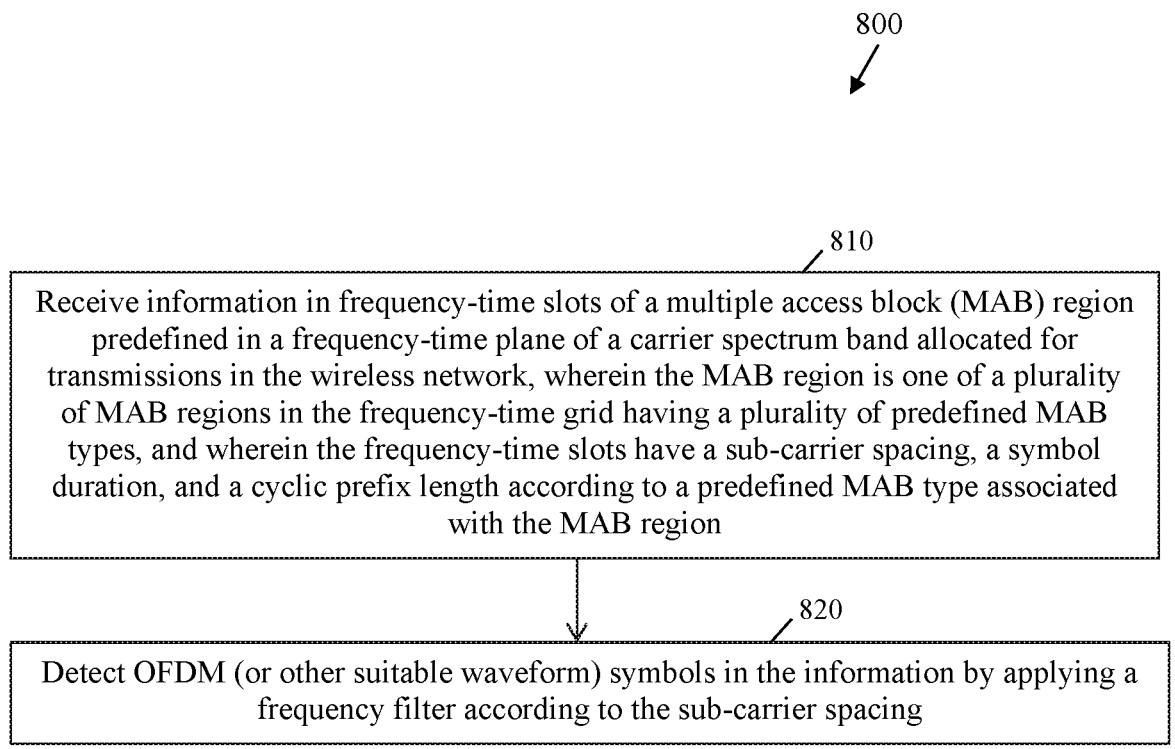
FIG. 8 illustrates a flow diagram of an embodiment method for accessing variable sub-carrier spacing and symbol duration according to different MAB types.

FIG. 8 illustrates an embodiment method 800 for accessing variable flexible sub-carrier spacing and symbol duration according to different MAB types. The method 800 can be implemented by a network device, which can be a transmitter or a receiver. Both the transmitter and the receiver need to transmit and receive the signal according to the waveform corresponding to the selected MAB type. The transmitter can be base station (BS), a radio access point or node, or a UE. Similarly, the receiver also be a BS or a UE. At step 810, information is received in frequency-time slots of a MAB region predefined in a frequency-time plane of carrier spectrum band allocated for transmissions in the wireless network. The MAB region is one of a plurality of MAB regions in the frequency-time plane having a plurality of predefined MAB types. The frequency-time multiple-access blocks have a sub-carrier spacing, a useful symbol length, and a cyclic prefix length according to a predefined MAB type associated with the MAB region or dynamically defined MAB types (e.g., via signaling of parameters). At step 820, the device detects OFDM or other waveform (e.g., FBMC) symbols within the information by applying a frequency filter according to the sub-carrier spacing. This is achieved by implementing a F-OFDM scheme in accordance with the sub-carrier spacing of the MAB type.

Figure 9:
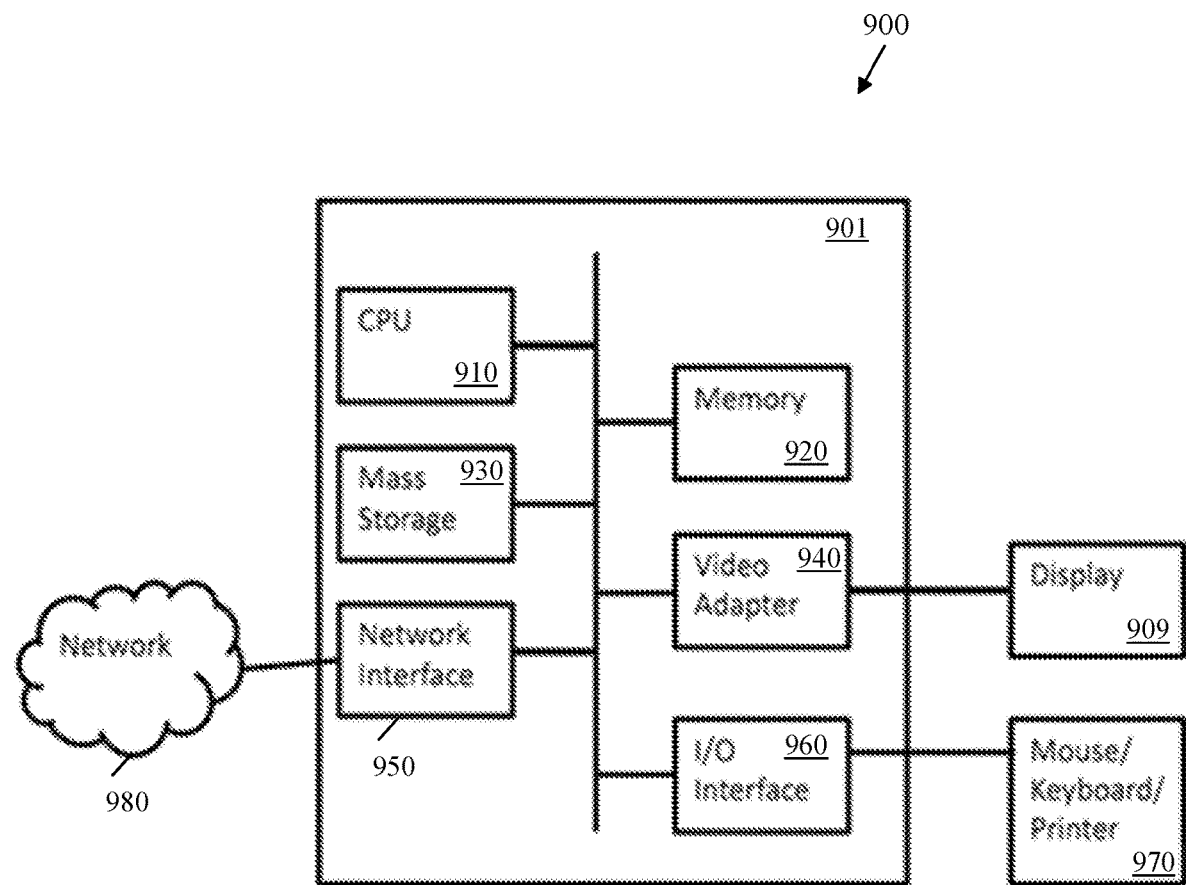
FIG. 9 is a diagram of a processing system that can be used to implement various embodiments.

FIG. 9 is a block diagram of a processing system 900 that can be used to implement various embodiments. The processing system 900 can be part of a BS, a UE, or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, a memory 920, a mass storage device 930, a video adapter 940, and an I/O interface 960 connected to a bus. The bus may be one or more of any type of several bus architectures including a memory bus or memory controller, a peripheral bus, a video bus, or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus. The mass storage device 930 may comprise, for example, one or more of a solid state drive, hard disk drive, a magnetic disk drive, an optical disk drive, or the like.

The video adapter 940 and the I/O interface 960 provide interfaces to couple external input and output devices to the processing unit. As illustrated, examples of input and output devices include a display 990 coupled to the video adapter 940 and any combination of mouse/keyboard/printer 970 coupled to the I/O interface 960. Other devices may be coupled to the processing unit 901, and additional or fewer interface cards may be utilized. For example, a serial interface card (not shown) may be used to provide a serial interface for a printer.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network component supporting wireless communications, comprising:

sending, by the network component to a user equipment (UE), a multiple access block (MAB) region assignment via a first signaling to semi-statically configure a MAB region, wherein the MAB region corresponds to a first frequency partition of a plurality of frequency partitions of a carrier spectrum band, the MAB region is associated with a first MAB type of multiple MAB types, and the first MAB type comprises a first sub-carrier spacing and a first symbol duration; and communicating, by the network component with the UE, a first transmission within the first frequency partition using the first MAB type, wherein the multiple MAB types comprise a second MAB type, the second MAB type comprises a second sub-carrier spacing and a second symbol duration, the first sub-carrier spacing is a two or four multiple of the second sub-carrier spacing, and the second symbol duration is a two or four multiple of the first symbol duration, and wherein the first symbol duration equals a sum of a first useful symbol length and a first cyclic prefix (CP) length, the second symbol duration equals a sum of a second useful symbol length and a second CP length, the second useful symbol length is two or four multiple of the first useful symbol length, and the second CP length is two or four multiple of the first CP length.

2. A network component comprising:

a processor; and a transceiver operatively coupled to the processor and configured for:

sending, to a user equipment (UE), multiple access block (MAB) region assignment via a first signaling to semi-statically configure a MAB region, wherein the MAB region corresponds to a first frequency partition of a plurality of frequency partitions of a carrier spectrum band, the MAB region is associated with a first MAB type of multiple MAB types, and the first MAB type comprises a first sub-carrier spacing and a first symbol duration; and communicating, by the network component with the UE, a first transmission within the first frequency partition using the first MAB type, wherein the multiple MAB types comprise a second MAB type, the second MAB type comprises a second sub-carrier spacing and a second symbol duration, the first sub-carrier spacing is a two or four multiple of the second sub-carrier spacing, and the second symbol duration is a two or four multiple of the first symbol duration, and wherein the first symbol duration equals a sum of a first useful symbol length and a first cyclic prefix (CP) length, the second symbol duration equals a sum of a second useful symbol length and a second CP length, the second useful symbol length is two or four multiple of the first useful symbol length, and the second CP length is two or four multiple of the first CP length.

3. A method by an apparatus supporting wireless communications, comprising:
receiving, by the apparatus from a network component, multiple access block (MAB) region assignment via a first signaling to semi-statically configure a MAB region, wherein the MAB region corresponds to a first frequency partition of a plurality of frequency partitions of a carrier spectrum band, the MAB region is associated with a first MAB type of multiple MAB types, and the first MAB type comprises a first sub-carrier spacing and a first symbol duration; and
communicating, by the apparatus with the network component, a first transmission within the first frequency partition using the first MAB type,
wherein the multiple MAB types comprise a second MAB type, the second MAB type comprises a second sub-carrier spacing and a second symbol duration, the first sub-carrier spacing is a two or four multiple of the second sub-carrier spacing, and the second symbol duration is a two or four multiple of the first symbol duration, and
wherein the first symbol duration equals a sum of a first useful symbol length and a first cyclic prefix (CP) length, the second symbol duration equals a sum of a second useful symbol length and a second CP length, the second useful symbol length is two or four multiple of the first useful symbol length, and the second CP length is two or four multiple of the first CP length.

4. An apparatus, comprising:
a processor; and
a transceiver operatively coupled to the processor and configured for:
receiving, from a network component, multiple access block (MAB) region assignment via a first signaling to semi-statically configure a MAB region, wherein the MAB region corresponds to a first frequency partition of a plurality of frequency partitions of a carrier spectrum band, the MAB region is associated with a first MAB type of multiple MAB types, and the first MAB type comprises a first sub-carrier spacing and a first symbol duration; and
communicating, with the network component, a first transmission within the first frequency partition using the first MAB type,
wherein the multiple MAB types comprise a second MAB type, the second MAB type comprises a second sub-carrier spacing and a second symbol duration, the first sub-carrier spacing is a two or four multiple of the second sub-carrier spacing, and the second symbol duration is a two or four multiple of the first symbol duration, and
wherein the first symbol duration equals a sum of a first useful symbol length and a first cyclic prefix (CP) length, the second symbol duration equals a sum of a second useful symbol length and a second CP length, the second useful symbol length is two or four multiple of the first useful symbol length, and the second CP length is two or four multiple of the first CP length.

5. The method of claim 1, wherein the carrier spectrum band comprises a second frequency partition occupying a different frequency partition with the first frequency partition in the second symbol duration.

6. The method of claim 1, wherein at least one frequency partition in the plurality of frequency partitions has a different size than another frequency partition in the plurality of frequency partitions.

7. The network component of claim 2, wherein the carrier spectrum band comprises a second frequency partition occupying a different frequency partition with the first frequency partition in the second symbol duration.

8. The network component of claim 2, wherein at least one frequency partition in the plurality of frequency partitions has a different size than another frequency partition in the plurality of frequency partitions.

9. The method of claim 3, wherein the carrier spectrum band comprises a second frequency partition occupying a different frequency partition with the first frequency partition in the second symbol duration.

10. The method of claim 3, wherein at least one frequency partition in the plurality of frequency partitions has a different size than another frequency partition in the plurality of frequency partitions.

11. The apparatus of claim 4, wherein the carrier spectrum band comprises a second frequency partition occupying a different frequency partition with the first frequency partition in the second symbol duration.

12. The apparatus of claim 4, wherein at least one frequency partition in the plurality of frequency partitions has a different size than another frequency partition in the plurality of frequency partitions.

13. The method of claim 1, further comprising:
before the communicating the first transmission:
filtering, by the network component, the first transmission to the first frequency partition using a first digital filter.

14. The method of claim 1, wherein the first MAB type is a first special MAB type, the first special MAB type being a predetermined MAB type used for a synchronization channel and a broadcast channel, the method further comprising:
transmitting, by the network component, the special first MAB type in response to the UE accessing a network.

15. The method of claim 1, further comprising:
sending, by the network component, signaling indicating the first MAB type.

16. The network component of claim 2, the processor figured for:
before the communicating the first transmission:
filtering the first transmission to the first frequency partition using a first digital filter.

17. The network component of claim 2, wherein the first MAB type is a first special MAB type, the first special MAB type being a predetermined MAB type used for a synchronization channel and a broadcast channel, the transceiver further configured for:
transmitting the special first MAB type in response to the UE accessing a network.

18. The network component of claim 2, the transceiver further configured for:
sending signaling indicating the first MAB type.

19. The method of claim 3, wherein the first transmission is filtered to the first frequency partition using a first digital filter.

20. The method of claim 3, wherein the first MAB type is a first special MAB type, the first special MAB type being a predetermined MAB type used for a synchronization channel and a broadcast channel, the method further comprising:

receiving, by the apparatus, the special first MAB type in response to the apparatus accessing a network.

21. The method of claim 3, further comprising:

receiving, by the apparatus, signaling indicating the first MAB type.

22. The apparatus of claim 4, wherein the first transmission is filtered to the first frequency partition using a first digital filter.

23. The apparatus of claim 4, wherein the first MAB type is a first special MAB type, the first special MAB type being a predetermined MAB type used for a synchronization channel and a broadcast channel, the transceiver further configured for:

receiving the special first MAB type in response to the apparatus accessing a network.

24. The apparatus of claim 4, the transceiver further configured for:

receiving signaling indicating the first MAB type.

\* \* \* \* \*